March 25, 1969 E. WINKLER 3,434,584
EXTENDIBLE CONVEYOR
Filed April 26, 1967 Sheet 1 of 4
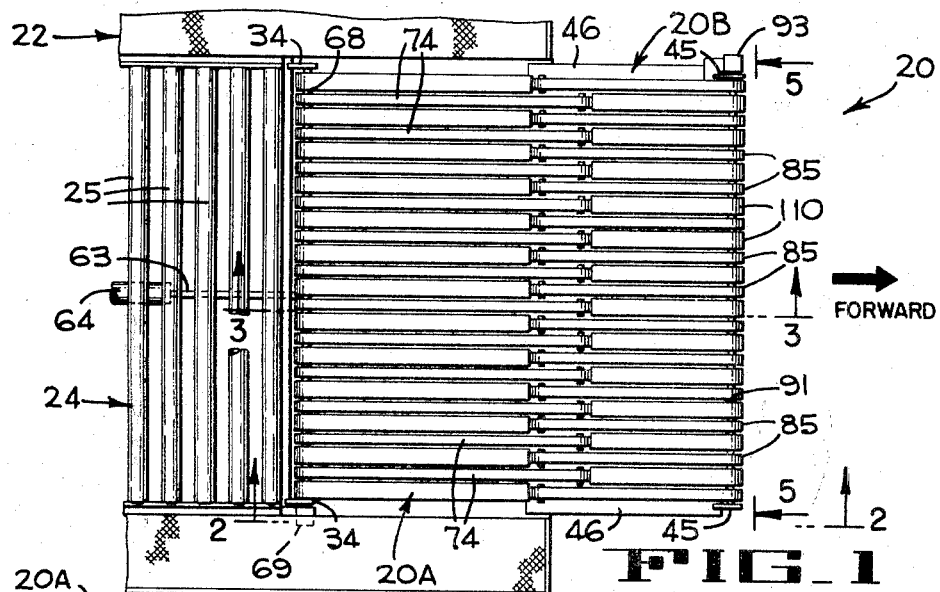
FIG_1
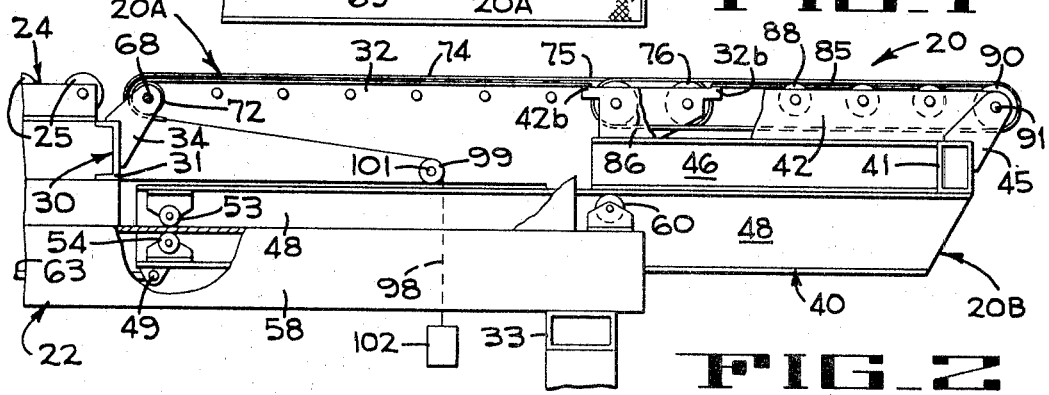
FIG_2
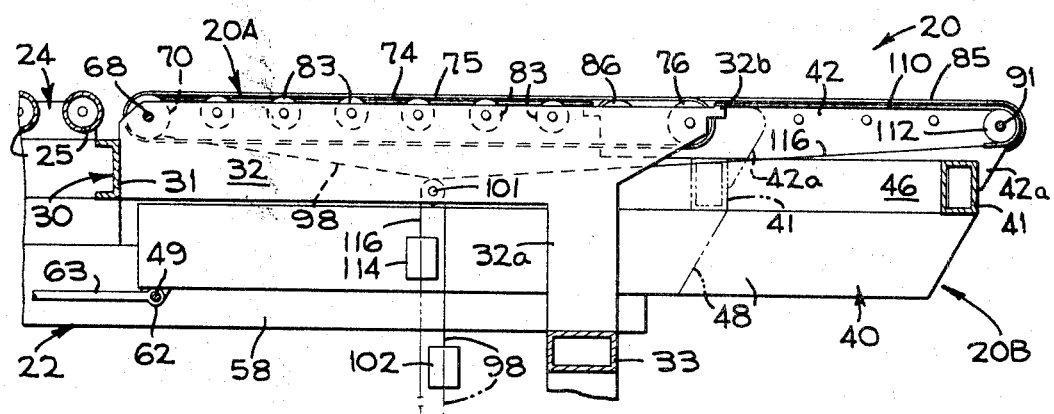
FIG_3
INVENTOR.
EDWIN WINKLER
BY
Francis W. Anderson
ATTORNEY

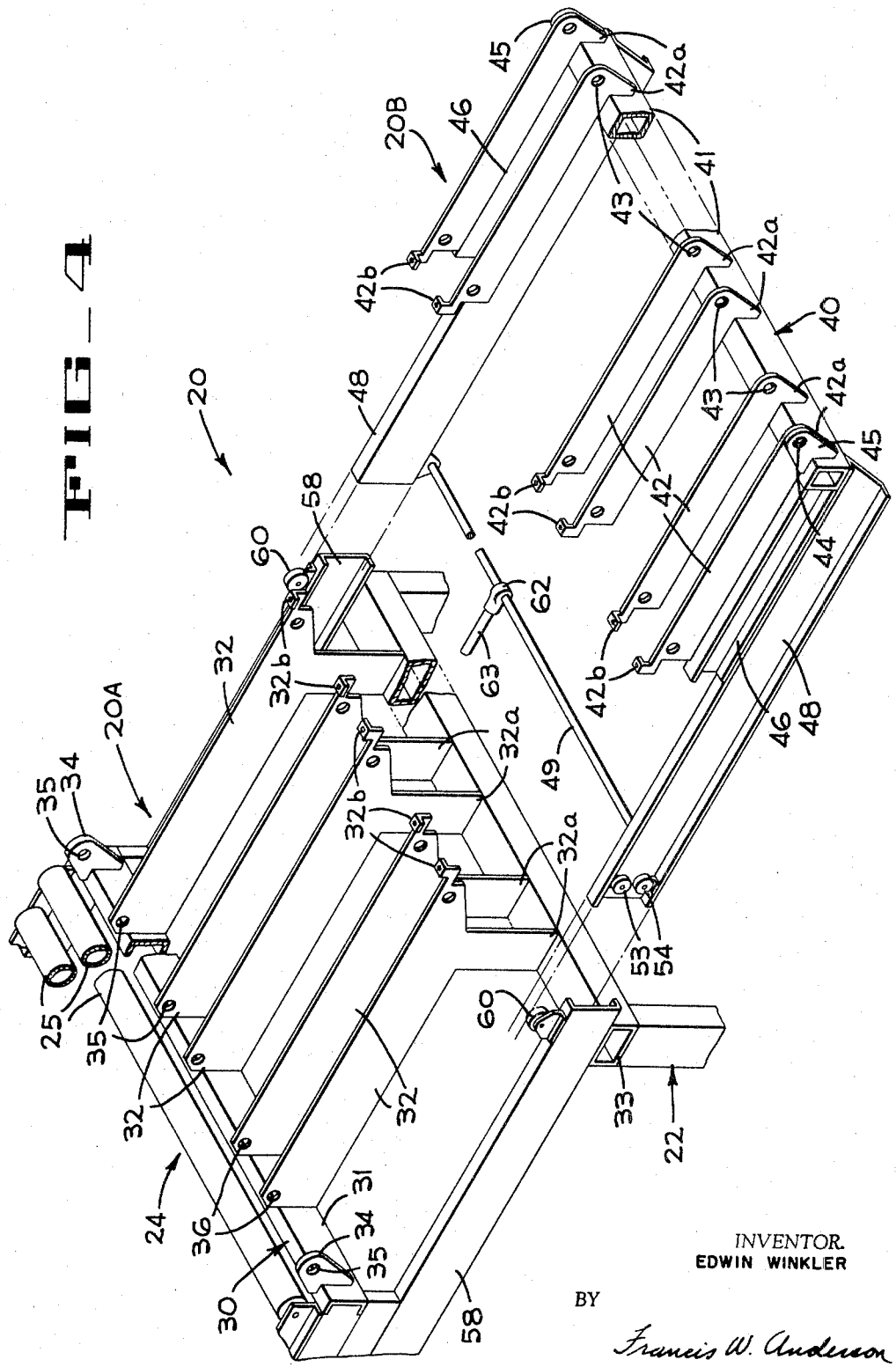

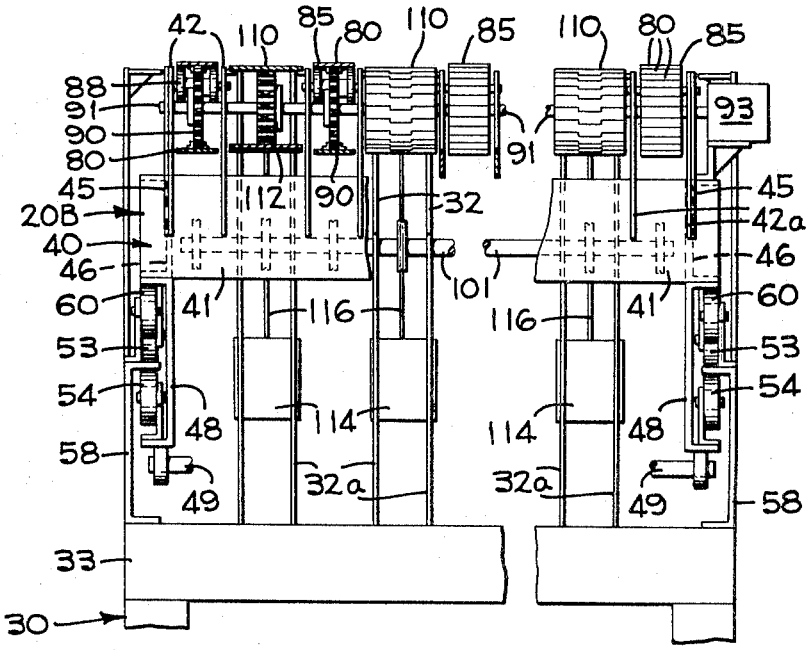
FIG_5
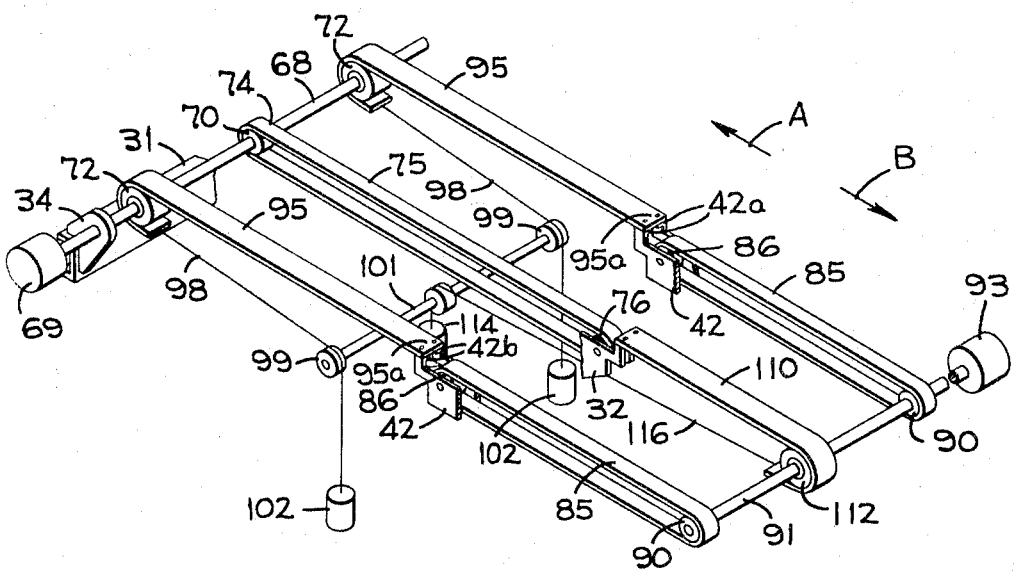
FIG_6
INVENTOR.
EDWIN WINKLER
BY
Francis W. Anderson
ATTORNEY

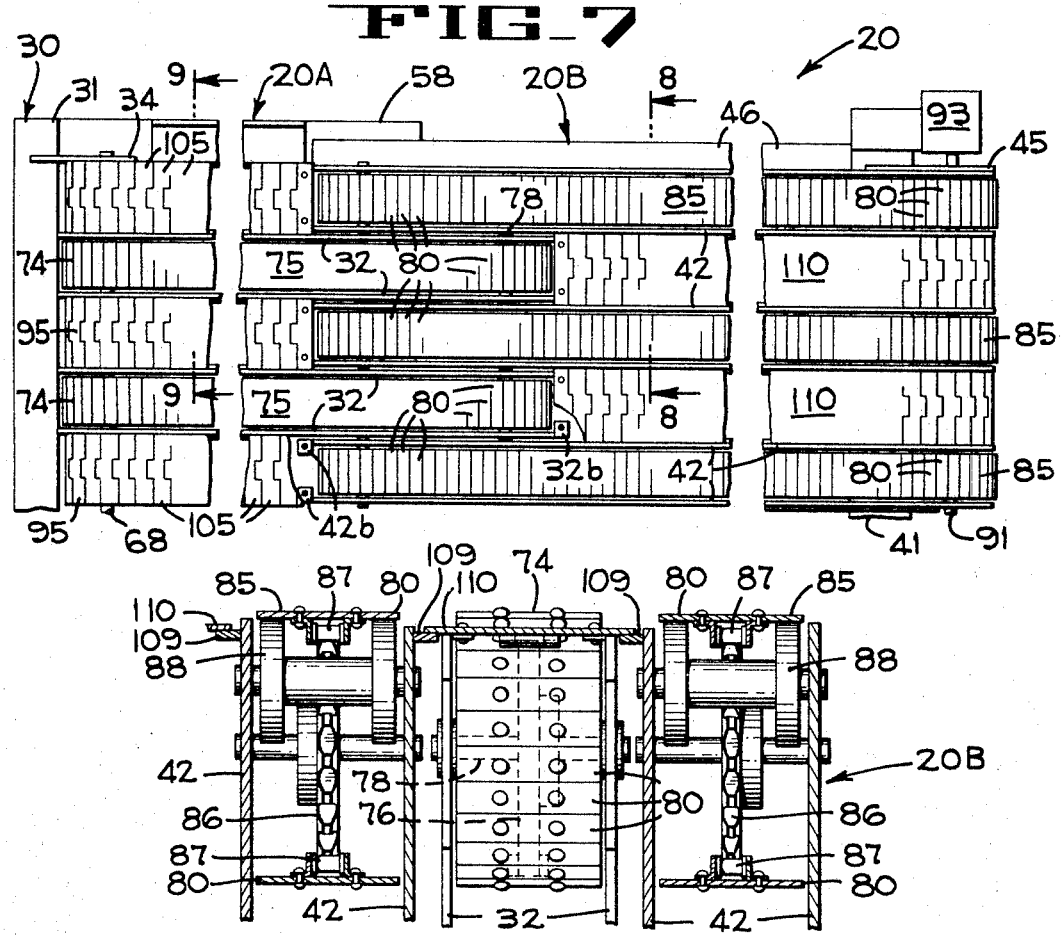
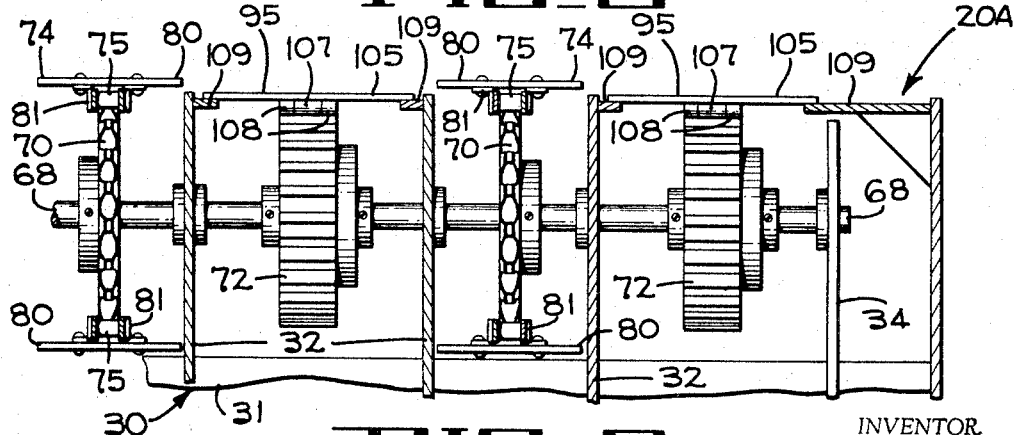

United States Patent Office 3,434,584
Patented Mar. 25, 1969

3,434,584
EXTENDIBLE CONVEYOR
Edwin Winkler, San Jose, Calif., assignor to FMC Corporation, San Jose, Calif., a corporation of Delaware
Filed Apr. 26, 1967, Ser. No. 633,894
Int. Cl. B65g *37/00, 15/12*
U.S. Cl. 198—89         13 Claims

ABSTRACT OF THE DISCLOSURE

The conveyor is made up of two parts; a fixed section that has a plurality of spaced forwardly-extending arms, and a movable section that has spaced, rearwardly-extending arms that interdigitate with the arms of the fixed section. Each of the arms carries a power-driven endless chain conveyor member and, when the two sections are in interdigitated or closed relation, a substantially continuous conveyor surface is provided. When the movable section moves away from the interdigitated position, the openings that would normally be formed between the arms of the fixed conveyor section, are closed by flat, load supporting chain-like members that are drawn into the gaps behind the arms of the fixed section and between the arms of the receding section by the receding section itself to provide a substantially continuous surface having no openings therein large enough to be a hazard to a workman or to an article passing over the surface.

Background of the invention

This invention relates to article conveyors having extendible sections.

Description of the prior art

Cargo handling systems, that deliver articles to and receive articles from carriers whose final position cannot be accurately forecast, such as the system disclosed in the patent to Williams et al. No. 3,263,832, make use of conveyors of the type that has a section at its delivery end which can be adjustably moved toward or away from the main portion of the conveyor so that the end of the delivery section can be positioned in most advantageous article-transfer relation to the carrier in any position of the carrier. Heretofore such extendible sections were not power actuated and the conveying movement imparted by the preceding part of the conveyor had to be relied on to propel articles over the unpowered section. Also, previous extendible conveyors used an interdigitating arm arrangement which formed a substantially continuous surface when the sections were in closed, interdigitated relation; however, when the extendible section of the conveyor was moved away from the main portion of the conveyor, large, undesirable, openings were formed between the arms of the conveyor sections. The present invention overcomes these difficulties by providing power for all elements of both sections of the discharge conveyor, and by providing means for closing the openings between the elements of the conveyors in all positions of the conveyor.

Summary of the present invention

The extendible conveyor of the present invention comprises a fixed section that has a plurality of forwardly-extending arms, and a movable section that has spaced, rearwardly-extending arms which interdigitate with the arms of the fixed conveyor section. A motor is connected in driving engagement with the conveying elements of each conveyor section so that the elements can be operated in all positions of the conveyor sections. When the movable section is moved to a position close to the fixed section, the arms of the two sections are close together and a substantially continuous conveyor surface is provided. When the movable section is adjustably moved away from the fixed section, it draws a filler strip into the spaces which progressively open between the arms of the conveyor sections to close these spaces, and to thereby maintain the continuity of the surface formed by the conveyor sections.

Other features of the present invention will be apparent from the following description taken in connection with the accompanying drawings.

In the drawings

FIGURE 1 is a schematic plan view of the conveyor of the present invention.

FIGURE 2 is an enlarged schematic section, with parts broken away, taken along line 2—2 of FIG. 1.

FIGURE 3 is an enlarged schematic section taken along line 3—3 of FIG. 1.

FIGURE 4 is an exploded schematic perspective of the frame sections of the conveyor of FIG. 1.

FIGURE 5 is an enlarged schematic view taken along line 5—5 of FIG. 1, with parts broken away.

FIGURE 6 is a fragmentary schematic perspective of a portion of the conveyor of FIG. 1.

FIGURE 7 is an enlarged fragmentary schematic plan of a portion of the conveyor of FIG. 1.

FIGURE 8 is an enlarged section taken along line 8—8 of FIG. 7.

FIGURE 9 is an enlarged section taken along line 9—9 of FIG. 7.

Description of the preferred embodiment

In FIGURE 1, the reference numeral 20 indicates generally the extendible conveyor of the present invention and, in the illustrated arrangement, the conveyor 20 is mounted at an elevated position in a rigid support structure 22 that also supports a conventional delivery conveyor 24 having power-driven rollers 25 capable of delivering articles, or pallet loads of articles to the conveyor 20 for transfer into a cargo carrier such as an airplane. The conveyor 20 includes a fixed section 20A, and a section 20B that is adjustably movable relative to section 20A to position the outer end of the section 20B in desired position relative to the loading door of a cargo airplane so that articles can be moved into or out of the plane.

The fixed conveyor section 20A includes a rigid frame 30 (FIG. 4) comprising a transverse channel 31 that is secured to the rigid support structure 22, as by bolting. A plurality of arms 32 are secured to channel 31 and project forwardly therefrom in spaced relation, each arm 32 having a depending portion 32a resting on a rigid member 33 of the support structure 22. At its extreme forward end, each arm is provided with an apertured tab 32b. The transverse channel 31 carries, near each end, a short arm 34 which has a cylindrical hole 35 therein aligned with similar holes 36 in the main arms 32.

The movable conveyor section 20B includes a rigid frame 40 comprising a transverse box beam 41 to which is secured a plurality of spaced rearwardly-projecting arms 42, each arm having a forward hooked end portion 42a secured, as by welding, to the box beam and a rearward end provided with horizontal apertured tabs 42b. The hooked forward ends of the arms have cylindrical apertures 43 that are aligned with each other and with apertures 44 in short arms 45 projecting upwardly and forwardly from the box beam. At each end of the box beam 41, a channel 46 is secured to the beam and projects rearwardly therefrom, with one edge of the channel underlying the arms 42 and 45 at that end of the beam, substantially as shown in FIG. 5. Secured to and underlying each channel 46 is a longer channel 48, and a cross-rod 49 is secured between the rearward end portions of the two long channels 48 so that the interconnected members shown in FIG. 4 provide a rigid frame.

The movable frame 40 is supported at each side in rolling engagement with the support structure 22 by means of two rollers 53 and 54 that are rotatably mounted in each channel 48. As seen in FIG. 5, the rollers 53 and 54 are disposed on opposite sides of the upper flange of a channel 58 which is part of the support structure. In addition, a roller 60 that is mounted on the upper surface of each channel 58 engages the undersurface of the upper flange, each channel 48 in rollable supporting relation. The transverse rear rod 49 of the frame 40 pivotally receives an eye 62 connected to the piston rod 63 of a double-acting hydraulic power cylinder 64 (FIG. 1). Energization of the cylinder 64 is effective to either move the movable frame 40 toward interdigitating position or away from said position.

A drive shaft 68 (FIG. 6), which is coupled to a reversible hydraulic motor 69 supported on frame 30, extends across the rear end of the fixed conveyor section 20A, being rotatably journalled in the aligned cylindrical openings 35 and 36 (FIG. 4) of the arms 34 and 32, respectively. The drive shaft 68 has a plurality of sprockets 70 (FIG. 9) keyed thereon and a plurality of rollers 72 journalled for free rotation, the rollers and the sprockets being positioned alternately along the length of the shaft. Each sprocket 70 is the drive sprocket of an endless chain conveyor 74 that includes a chain 75 and a forward sprocket 76. As seen in FIG. 8 each forward sprocket 76 is keyed to a short shaft 78 which is journalled for free rotation in two adjacent arms 32 of the fixed frame 30. Each chain 75 carries a plurality of flat plates 80 (FIG. 7) that are secured to the chain by special brackets 81 (FIG. 9) and are so spaced along the chain that they form a substantially continuous conveying surface. Rollers 83 which support the upper run of the chain are journalled for free rotation between arms 32 of the fixed frame 30 at spaced intervals (FIG. 3) along the length of the upper run.

When the forward conveyor section is disposed in interdigitated relation with the rear section, the spaces between the spaced endless chain conveyors 74 of the rear section are occupied by endless chain conveyors 85 (FIGS. 1 and 2) that are mounted in laterally spaced relation on the forward conveyor section. Each conveyor 85 is substantially identical to each conveyor 74 and includes a rear sprocket 86 (FIG. 2), an endless chain 87 which carries a plurality of the short flat plates 80, support rollers 88 underlying the upper run of the chain, and a forward sprocket 90 keyed to a transverse drive shaft 91. The shaft 91, which is rotatably journalled in the openings 43 and 44 of the movable frame 40 (FIG. 4), is driven by a reversible hydraulic motor 93 (FIG. 1) which is supported on and movable with frame 40.

In FIG. 6, two of the several chain conveyors 85 of the forward conveyor section are shown schematically. It will be noted that, adjacent the rear end of each conveyor, the forward end 95a of a belt or deck chain 95 is secured, as by rivets, to the apertured horizontal tabs 42b provided at the rear end of adjacent arms 42 of the movable frame 40. Each belt 95 is also trained over one of the rollers 72 which is rotatable on the drive shaft 68 of the rear conveyor section, and a cable 98 is secured to the end of the belt 95. The cable is trained over a guide pulley 99 that is freely rotatable on a fixed shaft 101 (FIG. 5) which is supported by all of the arms 32 of the rear frame 30. A weight 102 is secured to the lower end of each cable so that the cable is held taut. It will be evident that, as the endless conveyors 85 of the forward conveyor section move in the direction of arrow A (FIG. 6), the counterweights 102 automatically retract the belt. When the forward conveyor section is moved in the direction of arrow B, the belt is automatically drawn into position between adjacent conveyors 74 of the rear section. Each belt 95 is made up of short flat plates 105 (FIGS. 7 and 9), adjacent plates being interconnected in pivotal relation by a pin (not shown) that extends through a pivot bushing 107 on one of the plates and aligned bushings 108 on the other plate. When the belt moves into position closing the space between adjacent conveyors 74, it rests on ledges 109 (FIG. 9) provided near the upper edge of each arm 32. The belts 95 therefore provide a rigid interlocked platform or deck surface which substantially closes the space between adjacent conveyors 74 and is capable of supporting a workman who may have occasion to walk across the surface when the conveyor is in extended position.

Referring again to FIG. 6, it will be noted that a similar belt or deck chain 110 is disposed forwardly of each conveyor 74, being connected to the horizontal tabs formed on the forward end of adjacent arms 32 of the fixed frame 30. Each belt is trained around a roller 112, that is free rotatable on drive shaft 91, and a weight 114 connected by a cable 116 to the belt 110 maintains the belt in taut condition. It will be evident that, when the forward conveyor section is moved in the direction of arrow A toward the rear section, each weight automatically shortens the effective support surface of the associated belt 110. On the other hand, when the forward section is moved in the direction of arrow B, each belt automatically assumes a position between adjacent conveyors 85 to maintain the continuity of the support surface provided by the conveyor sections. As seen in FIG. 1, there is one belt 110 disposed adjacent each conveyor belt 85 of the forward conveyor section and each belt is, of course, made of the conventional interlocked rigid plate construction described in connection with the belts 95 and is similarly supported on ledges 109 of the adjacent arms 42 of the movable frame 40. The belts 110 provide a rigid interlocked platform or deck surface in the same manner mentioned in connection with the belts 95.

The operation of the conveyor will be apparent from the foregoing discussion. It should be noted that the two motors 69 and 93 provide positive drive for the conveyors in all adjusted positions of the extendible section 20B. Also, it will be evident that the belts 95 and 110, which are pulled into position by movement of section 20B, are effective to close all spaces that might provide hazards to the operator.

Having thus described my invention, what I claim as new and desire to protect by Letters Patent is:

1. A conveyor comprising a first section having a plurality of conveying members in a single plane, a second section having a plurality of conveying members coplanar with the conveying members of said first section, means for effecting relative movement of said sections within a range of positions in which the conveying members of said sections are interdigitated and provide coplanar and substantially continuous conveying support for articles, and power means for driving the conveying members of each of said sections independently of the conveying members of the other section for all relative positions in said range of positions.

2. A conveyor according to claim 1 wherein each conveying member comprises an endless chain.

3. A conveyor according to claim 1 wherein said first conveying section comprises a fixed frame having a plurality of forwardly-projecting laterally-spaced arms and an endless chain conveyor mounted between certain adjacent arms, and said second conveying section comprises a rigid frame having a plurality of rearwardly-projecting laterally-spaced arms and an endless chain conveyor mounted between certain adjacent arms.

4. A conveyor comprising a first section having a plurality of forwardly-projecting laterally-spaced members having conveying members thereon, a second section having a plurality of laterally-spaced rearwardly-projecting members, means for effecting relative movement of said first and second sections between a closed position in which said rearwardly-projecting members are disposed alongside said forwardly-projecting members and an extended position in which said rearwardly-projecting members are spaced forwardly from said closed position a distance such that an open space is formed between certain of said forwardly-projecting members, and space-closing means movable into the open spaces after said rearwardly-projecting members have been moved forwardly.

5. A conveyor according to claim 4 wherein said rearwardly-projecting members include elements providing conveying surfaces.

6. A conveyor according to claim 4 wherein said space-closing means comprises a plurality of belts, each belt being trained over a roller near the rear portion of a space between adjacent forwardly-projecting members of said first conveying section and having a forward end portion attached to the rear end of the associated rearwardly-projecting member of said second conveyor section whereby said belt will be drawn into the space behind said rearwardly-projecting member as said member is moved forwardly.

7. A conveyor according to claim 6 wherein each belt comprises a plurality of pivotally interconnected rigid plates providing a load-supporting surface when drawn into position closing a space between forwardly-projecting members of said second conveying section.

8. A conveyor comprising a first section having a plurality of laterally-spaced, forwardly-projecting members having conveying elements thereon, a second section having a plurality of laterally-spaced rearwardly-projecting members, means for effecting relative movement of said conveyor sections between a rear position in which the rearwardly-projecting members of said second section are disposed between adjacent forwardly-projecting members of said first conveyor section and a forward position in which said rearwardly-projecting members are spaced forwardly from said closed position a distance such that spaces are formed between adjacent rearwardly-projecting members and between adjacent forwardly-projecting members, and space-closing means movable into the spaces between said rearwardly-projecting members as said sections are moved to said forward position.

9. A conveyor according to claim 8 wherein each of said space-closing means comprises a belt connected between said second conveyor section and one of said forwardly-projecting members whereby said belt is drawn into the space formed forwardly of said one member as said second conveyor section moves forwardly.

10. A conveyor according to claim 8 including space-closing means movable into the spaces formed between said forwardly-projecting members as said sections are moved to said forward position.

11. A conveyor according to claim 10 wherein each of said space-closing means comprises a belt formed of flat plates pivotally interconnected and providing a rigid article-supporting surface when moved into space-closing position.

12. A variable length deck type conveyor comprising complementary, oppositely extending and interdigitated assemblies; each assembly comprising a drive shaft, conveyor belt idlers, bracket means mounting said idlers a fixed distance from the drive shaft, conveyor belts trained over said drive shaft and idlers, and narrow longitudinally extendible-retractable platforms projecting from said bracket means away from and lower than the belts to form platform surfaces alongside the conveyor belts; and means mounting one drive shaft for motion relative to the other for varying the length of the conveyor and the platform surfaces.

13. The conveyor of claim 12, wherein said platforms are flexible members with the platform members of one assembly being draped over the drive shaft of the other assembly, and means for pulling on the free ends of said platform members.

References Cited

UNITED STATES PATENTS

| | | | |
|---|---|---|---|
| 2,950,815 | 8/1960 | Oberg | 198—189 X |
| 3,006,454 | 10/1961 | Penn | 198—89 |
| 3,334,725 | 8/1967 | Wardlaw et al. | 198—89 |

RICHARD E. AEGERTER, *Primary Examiner.*

U.S. Cl. X.R.

198—190